United States Patent Office 2,810,584
Patented Oct. 22, 1957

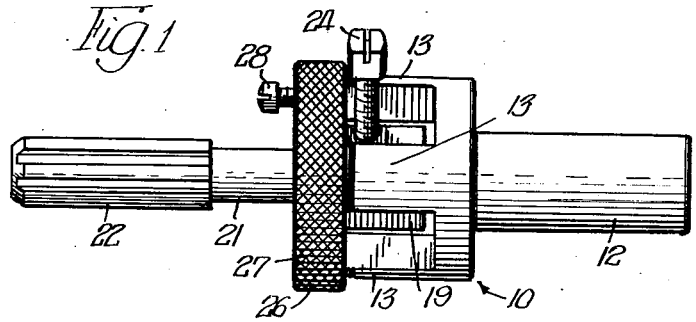
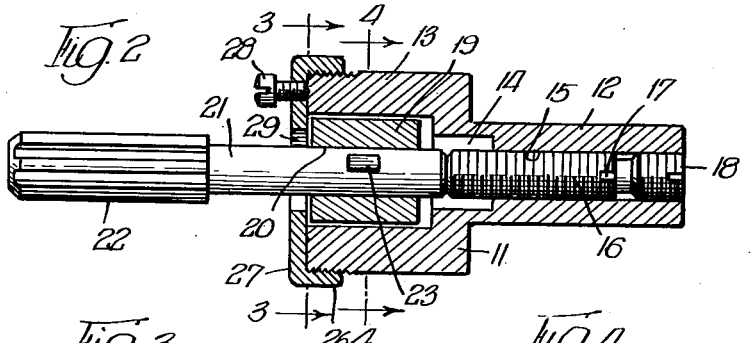
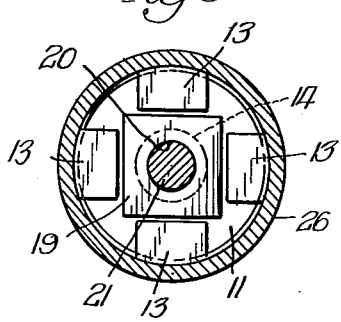 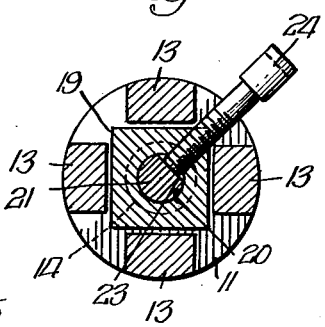
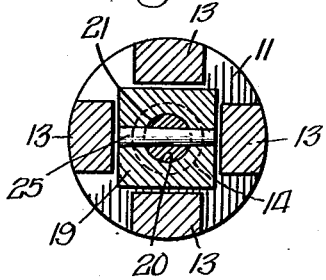
INVENTOR.
Max A. Slotta,

2,810,584

FLOATING REAMER AND HOLDER THEREFOR

Max A. Slotta, Antioch, Ill.

Application December 14, 1955, Serial No. 553,073

6 Claims. (Cl. 279—6)

The present invention relates to floating reamers and the holders therefor.

The principal object of the present invention is the provision of a suitable holder whereby the reamer may be quickly alined to the drilled hole in the work which is to be reamed, and whereby the reaming operation at a very close tolerance can be produced.

Another object of the present invention is the provision of a tool within which a reamer supporting bushing is receivable, with means therein provided for permitting floating action of the bushing and of the reamer transversely of the longitudinal axis of the reamer for effecting quick alinement of the reamer with the body portion in the work adjacent the drilled hole therein for reaming the same.

A still further object of the present invention is the provision of a multi-pronged holder for supporting therewithin a multi-faced bushing with which a reamer shank is engaged, and in which the faces of the bushing are in a parallelly spaced relation with the adjacent faces of the prongs, whereby a tolerance between the bushing and the prongs is effected for permitting a floating action of the reamer in order that the latter may adjust itself to the work during the reaming operation on a plane transverse to the longitudinal axis of the reamer.

A still further object of the present invention is the provision of a tool of the character hereinabove indicated wherein the free ends of the prongs aforesaid may be engaged by a cap, with means for longitudinal adjustment of the reamer shank in order to provide a tolerance between the cap and the reamer supporting bushing.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several view:

Fig. 1 is a side elevational view of the tool holder with a reamer in an operative position therewith;

Fig. 2 is a longitudinal cross sectional view of the holder;

Fig. 3 is a transverse cross section taken on line 3—3 of Fig. 2;

Fig. 4 is a transverse cross section taken on line 4—4 of Fig. 2; and

Fig. 5 is a similar view illustrating a modified form of connecting means between the bushing and the reamer shank.

Referring in detail to the present drawing there is shown therein a tool head generally indicated by 10, for supporting therewithin a reamer shank in a floating or transversely adjustable position. Said head 10 includes a circular base 11, from one face of which tubular shaft 12 projects in a rigid concentric relation.

Integrally formed with the opposite face of said base 11 and projecting therefrom in a perpendicular relation adjacent its rim portion, are four prongs 13, arranged in a crosswise formation, and laterally uniformly spaced from each other.

The outer faces of said prongs 13 are arcuate on transverse plane, conforming to the arc of the rim of said base 11, while the inner faces thereof are straight and are in equidistance from the longitudinal axial center of the tool. Said inner straight faces of said prongs 13 are located upon the sides of a square which is substantially defined thereby.

Said base 11 and the adjacent end of the tubular shaft 12 are provided with bore 14. Said shaft 12 is provided with a threaded bore 15, of a diameter smaller than that of bore 14, and remains in a concentric, merged relation with the latter.

Receivable in a threaded relation with said bore 15 is an adjusting screw 16, the inner end of which is flat, hardened and polished and enters said bore 14. The opposite end of said screw 16 is provided with a screw slot 17 for adjusting said screw 16 in a longitudinal relation by employment of a screw driver or a like tool. Receivable within the outer end of said bore 14 in a threaded relation is adjusting lock screw 18, which may be driven in contact with the adjacent outer end of said screw 16 for maintaining the latter in its adjusted position within said shaft 12 and bore 14.

Receivable within the space defined by the inner faces of said prongs 13 is bushing 19 which is of a square formation on a transverse cross section. The lateral faces of said bushing 19 normally do not contact with the adjacent straight inner faces of said prongs 13, but there is a tolerance therebetween for permitting shifting of said bushing 19 to or away from the inner faces of said prongs 13 in a transverse relation.

Bushing 19 is provided with a longitudinal central bore 20 for accommodating therewithin shank 21 of reamer 22. Said shank 21 is provided with a flat surface portion 23, to be frictionally engaged by the inner end of screw 24 which is passed through a corner of said bushing 19 in a threaded relation, as is best seen in Fig. 4.

Said screw 24 is disposed within the space defined by a pair of adjacent prongs 13, as is seen in Fig. 4, and during the operation of the holder and of the reamer said screw 24 does not come in contact with any one of the said adjacent prongs 13. In a chucking reamer it is preferable to use screw 24 for engaging shank 21 for the purpose of interlocking bushing 19 with said shank 21.

In the modified form of the interlocking means between bushing 19 and shank 21, shown in Fig. 5, a transverse alined bore is made in the two for receiving therewithin a lock pin 25. It is preferable to use pin 25 for interlocking bushing 19 with shank 21 in stub reamers with pin hole in the shank.

The outer ends of prongs 13 are threaded to receive in threaded engagement flange 26, which is integrally formed with cap 27 and which has its outer periphery knurled for facilitating manual turning thereof for engagement with the threads on prongs 13 or for disengaging the same therefrom.

The inner end of lock screw 28 passed through said cap 27 extends between a pair of adjacent prongs 13 for the purpose of preventing the disengagement of said cap 27 from the ends of prongs 13 which might otherwise ensue due to the vibration when a rotary movement is imparted to the holder and the reamer.

Central aperture 29 is provided in cap 27, said aperture being of a diameter greater than the diameter of shank 21, so that said shank 21 at no time comes in contact with the adjacent body portion of said cap 27 during the operation of the holder and reamer.

Said shaft 12 is engageable by a chuck or the like in a turret lathe or a similar metal working machine.

The length of said bushing 19 is smaller than the distance between cap 27 and base 11, so that the adjacent end of said bushing 19 remains at all times spaced from said base 11 during the operation of the holder.

Preparatory to the engagement of the reamer with the holder the adjusting screw 16 is retracted on first removing lock screw 18. While flange 26 and cap 27 remain disengaged from prongs 13, with lock screw 28 loosened, thereupon bushing 19, engaged with shank 21 through the medium of screw 24 or lock pin 25, as the case may be, is inserted within the space in head 10 defined by the inner faces of prongs 13. Preparatory to the insertion thereof cap 27 may remain loosely positioned upon shank 21. When the insertion of bushing 19 within prongs 13 has been effected flange 26 is then screwed on the outer free ends of prongs 13 until the inner face of cap 27 comes in contact with the ends of said prongs 13. Thereupon lock screw 28 is applied until the same is in a frictional contact with the end of one of said prongs 13. Immediately after insertion of said bushing 19 within the space defined by said prongs 13 there is no objection if the inner end of said bushing 19 comes to rest upon the adjacent face of base 11. Thereupon adjusting screw 16 is driven against the adjacent free end of shank 21 for shifting the latter in an outward direction with relation to the holder, until the outer end of bushing 19 comes in contact with the inner face of cap 27. When this has been done the adjusting screw 16 is slightly retracted by imparting to it a turn of perhaps one-fourth of revolution in order to bring about a space or tolerance between the adjacent end of bushing 19 and the inner face of cap 27, as is seen in Fig. 2, for the purpose of preventing any frictional contact therebetween during the operation of the holder and reamer. Thereupon lock screw 18 is applied to maintain said adjusting screw 16 in its adjusted relation with shank 21 and bushing 19.

From the hereinabove description it will be apparent that in its operative position with relation to head 10 and cap 27, as is seen in Fig. 2, bushing 19 will remain spaced by its side walls from the adjacent inner faces of prongs 13, and its ends will remain spaced from base 11 and cap 27, respectively.

In the operative position of the reamer with relation to the holder, as is shown in Fig. 2, the inner end of adjusting screw 16 will provide a flat seat for the adjacent inner end of shank 21, upon which the same may slide in all directions, transversely of the holder, for permitting reamer 22 to assume proper alined position in a transverse direction with relation to the bore in the work to be reamed to a smooth finish and close tolerance.

The flat end of adjusting screw 16 is hardened and polished to facilitate the sliding action of the reamer shank 21 permitting reamer 22 to come in alinement with the drilled bore in the work while the reamer moves forward thereinto during the reaming operation.

Obviously, there may be more than two of prongs 13 uniformly spaced from each other on a transverse cross section. Bushing 19 may have as many lateral faces as there are prongs. The holder is not restricted to only four prongs as shown in the drawing.

While fashioning or machining of the prongs such as prongs 13 is a comparatively easy operation by employment of a suitable tool, giving access thereto through the spaces between the prongs for grinding, filing and polishing of the inner faces of the prongs, it is nevertheless to be understood, that in lieu of prongs 13 a solid socket may be employed which on its inner periphery may be provided with a polygonal wall including a plurality of uniformly arranged faces corresponding to the inner faces of prongs 13. Such socket would work equally well, although its machining may be more difficult than the fashioning of prongs 13. Therefore, in one aspect of the invention prongs 13 may be considered as a socket.

While there is described herein a preferred embodiment of the present invention, it is nevertheless to be understood that minor changes may be made therein without departing from the spirit and scope of the invention as claimed.

What I claim as new is:

1. A holder for supporting a reamer including the shank thereof in a floating relation, comprising a base, a plurality of prongs in excess of two in a rigid association with and extending from said base in a perpendicular relation therewith, said prongs being uniformly spaced from each other on a transverse cross section, a shank engaging bushing receivable within the space defined by the inner faces of said prongs, said bushing being provided with as many lateral faces as there are prongs, each face of said bushing remaining in a spaced parallel relation with the inner face of each prong, the inner free end of the shank extending beyond the adjacent end of said bushing, an adjustable seating member extending through said base, said seating member providing a support for the inner free end of the shank for permitting a sliding movement of the said inner free end of the shank in a transverse relation with the holder, and means for rigidly connecting the outer free ends of said prongs.

2. A holder for supporting a reamer including the shank thereof in a floating relation, comprising a base, a plurality of prongs in excess of two in a rigid association with and extending from said base in a perpendicular relation therewith, said prongs being uniformly spaced from each other on a transverse cross section and being provided with straight inner faces, a shank engaging bushing receivable within the space defined by the inner faces of said prongs, said bushing being provided with as many lateral faces as there are prongs, each face of said bushing remaining in a spaced parallel relation with the inner face of each prong, the inner free end of the shank extending beyond the adjacent end of said bushing, said latter end of said bushing being in a spaced relation with said base, an adjustable seating member extending through said base, said seating member providing a contactual support for the inner free end of the shank for permitting a sliding movement of the said inner free end of the shank in a transverse relation with the holder, and means for rigidly connecting the outer free ends of said prongs.

3. A holder for supporting a reamer including the shank thereof in a floating relation, comprising a base, a plurality of prongs in excess of two in a rigid association with and extending from said base in a perpendicular relation therewith, said prongs being uniformly spaced from each other on a transverse cross section and being provided with straight inner faces, a shank engaging bushing receivable within the space defined by the inner faces of said prongs, said bushing being provided with as many lateral faces as there are prongs, each face of said bushing remaining in a spaced parallel relation with the inner face of each prong, the inner free end of the shank extending beyond the adjacent end of said bushing, said latter end of said bushing being in a spaced relation with said base, an adjustable seating member extending through said base, said seating member providing a contactual support for the inner free end of the shank for permitting a sliding movement of the said inner free end of the shank in a transverse relation with the holder, and a cap threadedly engaging the outer free ends of said prongs for rigidly interconnecting the same, said cap being in a substantially parallel relation with said base, said cap being provided with a central aperture of a diameter greater than the diameter of the shank, the shank extending outwardly of the holder through said aperture.

4. A holder for supporting a reamer including the shank thereof in a floating transverse relation, comprising a base, a plurality of prongs in excess of two in a rigid association with and extending from said base in a perpendicular relation therewith, said prongs being uniformly spaced from each other on a transverse cross section and being provided with straight inner faces, a multifaced shank engaging bushing receivable within the space defined by the inner faces of said prongs, each face of said bushing remaining in a spaced parallel relation with the inner face of each of said prongs, the inner free end of the shank extending beyond the adjacent end of said bushing, said latter end of said bushing being in a spaced relation with said base, an adjustable seating member extending through said base in a central relation with the space defined by the inner faces of said prongs, and a cap threadedly engaging the outer free ends of said prongs for rigidly interconnecting the same, said cap being in a substantially parallel relation with said base, said cap being provided with a central aperture of a diameter greater than the diameter of the shank, the shank being adapted to extend outwardly of the holder through said aperture, said seating member providing a contactual support for the inner free end of the shank for permitting a sliding movement of the said inner free end of the shank in a transverse relation with the holder, said adjustable seating member being adapted to shift the shank in a longitudinal direction for shifting the opposite end of said bushing to or away from said cap for normally maintaining the latter end of said bushing in a spaced relation with saip cap during the operation of the holder.

5. A holder for supporting a reamer including the shank thereof in a floating transverse relation, comprising a base, a plurality of prongs in excess of two in a rigid association with and extending from said base in a perpendicular relation therewith, said prongs being uniformly spaced from each other on a transverse cross section and being provided with straight inner faces, a multifaced bushing receivable within the space defined by the inner faces of said prongs, the shank being passed through said bushing in a longitudinal central relation therewith, means for rigidly connecting said bushing with the shank, each face of said bushing remaining in a spaced parallel relation with the inner face of each of said prongs, the free end of the shank extending beyond the adjacent end of said bushing, said latter end of said bushing being in a spaced relation with said base, an adjustable seating member extending through said base in a central relation with the space defined by the inner faces of said prongs, and a cap threadedly engaging the outer free ends of said prongs for rigidly interconnecting the same, said cap being in a substantially parallel relation with said base, said cap being provided with a central aperture of a diameter greater than the diameter of the shank, the shank being adapted to extend outwardly of the holder through said aperture, said seating member providing a contactual support for the said inner free end of the shank in a transverse relation with the holder during the operation of the latter, said adjustable seating member being adapted to shift the shank in a longitudinal direction for shifting the opposite end of said bushing to or away from said cap for maintaining the latter end of said bushing in a spaced relation with said cap during the operation of the holder.

6. A holder for supporting a reamer including the shank thereof in a floating transverse relation, comprising a socket including a base, the inner wall of said socket being of a polygonal formation including a plurality of uniformly arranged faces, a polygonal bushing receivable within said socket, said bushing including a plurality of uniformly arranged walls corresponding to the number of the faces within said socket, said walls being in a spaced relation with said faces, the reamer shank being passed through said bushing in a longitudinal central relation therewith, means for rigidly connecting said bushing with the shank, the free end of the shank extending beyond the adjacent end of said bushing, said latter end of said bushing being in a spaced relation with said base, and an adjustable seating member extending through said base in a central relation with the polygonal wall of said socket, said seating member providing a contactual support for the said inner end of the shank in a transverse relation with the holder during the operation of the latter.

References Cited in the file of this patent

UNITED STATES PATENTS 2,700,548    Ehrich    Jan. 25, 1955

FOREIGN PATENTS 472,560    Canada    Mar. 27, 1951